United States Patent [19]
Trissel

[11] Patent Number: 6,039,765
[45] Date of Patent: Mar. 21, 2000

[54] COMPUTER INSTRUCTION WHICH GENERATES MULTIPLE RESULTS OF DIFFERENT DATA TYPES TO IMPROVE SOFTWARE EMULATION

[75] Inventor: David Wesley Trissel, Austin, Tex.

[73] Assignee: Motorola, Inc., Schaumburg, Ill.

[21] Appl. No.: 08/990,780

[22] Filed: Dec. 15, 1997

[51] Int. Cl.[7] .................................................. G06F 9/455
[52] U.S. Cl. ................................. 703/26; 703/27; 711/100
[58] Field of Search ..................................... 395/500, 703, 395/704, 705, 707, 800.01, 500.47, 500.48; 711/100

[56] References Cited

U.S. PATENT DOCUMENTS

| | | | |
|---|---|---|---|
| 5,293,167 | 3/1994 | Campbell, Jr. et al. ................ | 341/141 |
| 5,619,666 | 4/1997 | Coon et al. ............................. | 712/208 |
| 5,740,441 | 4/1998 | Yellin et al. ............................ | 395/704 |
| 5,898,885 | 4/1999 | Dickol et al. ........................... | 711/118 |

OTHER PUBLICATIONS

Hsieh et al, "Java Bytecode to Native Code Translation: The Caffeine Prototype and Preliminary Results", Proceedings of the 29th Annual IEEE/ACM International Symposium on Microarchitecture, pp. 90–97, Dec. 1996.

Ton et al, "Instruction Folding in Java Processor", IEEE 1997 International Conference on Parallel and Distributed Systems, pp. 138–143, Dec. 1997.

Berekovic et al, "Hardware Realization of a Java Virtual Machine for High Performance Multimedia Applications", 1997 IEEE Workshop on Signal Processing Systems SIPS 97—Design and Implementation, pp. 479–488, Nov. 1997.

MPCFPE32B/AD: "PowerPC™ Microprocessor Family: The Programming Environments for 32–Bit Microprocessors" (1997).

MPCFPE/D: "PowerPC™ Advance Information: PowerPC™ Programming Environments Technical Summary" (1995).

*Primary Examiner*—Kevin J. Teska
*Assistant Examiner*—Samuel Broda

[57] ABSTRACT

Accelerating software emulation and other data processing operations utilizes execution of a single computer instruction that produces multiple data type results from a single source. The instruction generates from a single operand a plurality of different types of outputs in a corresponding plurality of registers (102–106) which are available for use as input operands to subsequently executing instructions.

27 Claims, 5 Drawing Sheets

```
                    LA        RTABLEBASE, TABLEBASE
                    ⋮                                        11

FETCH:              LBZU      ROPCODE, 1(RPC)
FETCH2:             SWLI      ROPCODE, ROPCODE, 6
                    ADD       RTEMP, RTABLEBASE, ROPCODE
                    MTCTR     RTEMP
                    LBZU      ROPCODE, 1(RPC)
                    BCTR                                     12

TABLEBASE:          B         FETCH2                         16
                    ⋮

TABLEBASE+N*64:     EXTSB     ROPCODE
                    STWU      ROPCODE, -4(RSP)
                    B         FETCH                          20
                    ⋮

TABLEBASE+M*64:     LA        RSP, 4(RSP)
                    B         FETCH2                         22
                    ⋮
```

FIG.2
—PRIOR ART—

```
FETCH:              LBZU      ROPCODE, 1(RPC)
FETCH2:             INSRWI    RTABLEBASE, ROPCODE, 8, 6
                    MTCTR     RTABLEBASE
                    LBZU      ROPCODE, 1(RPC)
                    BCTR                                     12'
```

FIG.3

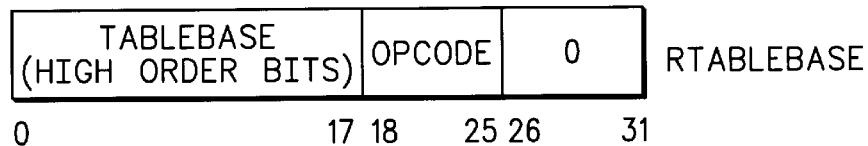

FIG.4

|  | LA | RTABLEBASE, TABLEBASE |
|---|---|---|
|  | : | 11 |

| FETCH: | LBZU | ROPCODE, 1(RPC) |
|---|---|---|
| FETCH2: | INSRWI | RTABLEBASE, ROPCODE, 8, 6 |
|  | MTCTR | RTABLEBASE |
|  | LGMDT | ROPCODE, 1(RPC) |
|  | BCTR | 12''' |

:

| TABLEBASE+N*64: | STWU | ROPCODE+1, −4(RSP) |
|---|---|---|
|  | B | FETCH    20'' |

|  | LA | ROPCODE+2, TABLEBASE |
|---|---|---|
|  | : | 11'''' |

| FETCH: | LGMDT | ROPCODE, 1(RPC), 8, 6 |
|---|---|---|
| FETCH2: | MTCTR | ROPCODE+2 |
|  | LGMDT | ROPCODE, 1(RPC), 8, 6 |
|  | BCTR | 12'''' |

:

| TABLEBASE+N*64: | STWU | ROPCODE+1, −4(RSP) |
|---|---|---|
|  | B | FETCH    20'''' |

:

| TABLEBASE+M*64: | LA | RSP, 4(RSP) |
|---|---|---|
|  | B | FETCH2    22'''' |

COMPUTER INSTRUCTION WHICH GENERATES MULTIPLE RESULTS OF DIFFERENT DATA TYPES TO IMPROVE SOFTWARE EMULATION

FIELD OF THE INVENTION

The present invention relates generally to computers, and more particularly to, emulation of software or execution of interpreted software.

BACKGROUND OF THE INVENTION

In the computer industry, emphasis is currently being placed on emulation technology and interpreted computer language execution to allow software to be executed on many different hardware platforms. The advantage of using emulation and interpreted language execution is that once software is written for execution on a single hardware platform, the same software can be ported to other hardware platforms without much additional effort. However, emulation and interpreted language execution require an extra layer of software between the user's executable software code and the physical hardware in order to achieve hardware independence of the user's software code. This additional layer of software is emulation overhead that is not typically found in other computer systems where user software is compiled directly for a specific hardware platform and executed directly on that hardware platform. Although the extra layer of software in emulation result in greater compatability independent of hardware nuances, slower user software execution may result.

A goal in the computer industry is to reduce the performance impact of this additional layer of software thereby increasing the speed of execution of various emulators or interpreted language machines (e.g., Java, Smalltalk, and BASIC). In order to reduce emulation overhead, the industry is attempting to produce customized hardware and simplify the intermediate layer of software whereby performance is improved. Therefore, the need exists for a new emulation fetch and decode routine which has reduced overhead whereby emulation/interpretation performance is improved.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which:

FIG. 2 illustrates, in a block diagram, the specific software instruction content of the software emulator of FIG. 1 wherein this software content is known in the art and has a large amount of emulation overhead;

FIG. 3 illustrates, in a block diagram, improved software instruction content which can be used to implement the software emulator of FIG. 1 with reduced emulation overhead in accordance with the present invention;

FIG. 4 illustrates, in a block diagram, a method for generating the vector address of a software instruction emulation routine in accordance with the present invention;

FIG. 5 illustrates, in a block diagram, improved software instruction content which can be used to implement the software emulator of FIG. 1 with reduced emulation overhead in accordance with the present invention;

FIG. 6 illustrates, in a block diagram, improved software instruction content which can be used to implement the software emulator of FIG. 1 with reduced emulation overhead in accordance with the present invention;

Figure 1:
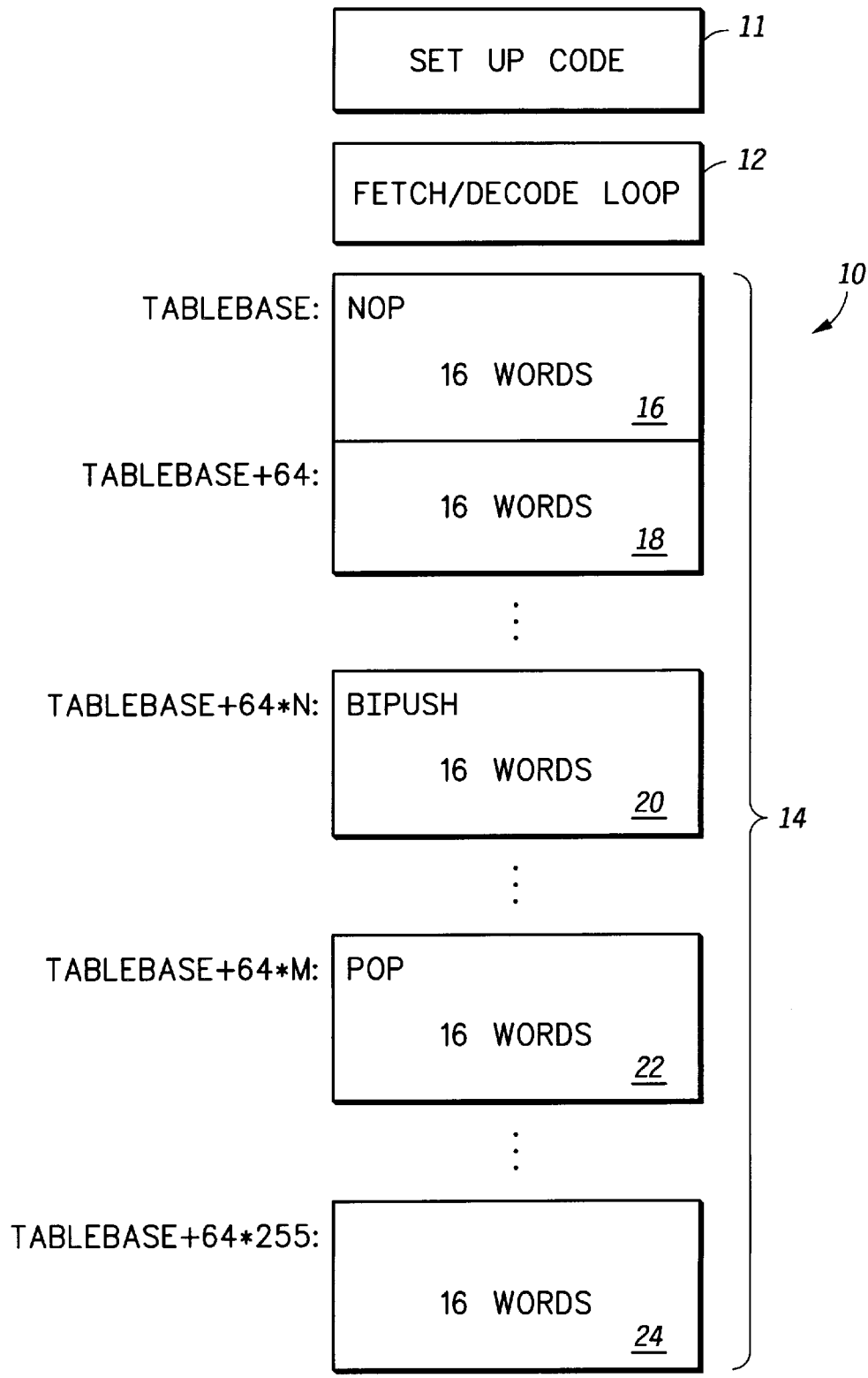
FIG. 1 illustrates, in a block diagram, an emulator software architecture for use in accordance with the present invention.

It will be appreciated that for simplicity and clarity of illustration, elements illustrated in the drawings have not necessarily been drawn to scale. For example, the dimensions of some of the elements are exaggerated relative to other elements for clarity. Further, where considered appropriate, reference numerals have been repeated among the drawings to indicate corresponding or analogous elements.

DETAILED DESCRIPTION

Generally, the present invention is a method and apparatus for reducing fetch and decode emulator overhead as well as opcode emulated execution overhead for an emulator system. The system taught herein can be used to perform any type of emulation or interpreted language execution to enable emulation of any computer language or execution of, for example, Java, Small Talk, or BASIC computer code. Specifically, a new computer instruction is used herein, where the new computer instruction processes instruction operands to generate a plurality of results which are stored into multiple registers wherein each register contains an the result in a different data format. Since this instruction (abbreviated LGMDT herein) provides the result in different registers using different formats or pre-processing on the result, the number of opcode emulation instructions needed in the emulator routines can be reduced whereby emulation or interpreted language execution will occur at a faster rate. In addition, due to this LGMDT instruction, fetch and decode emulation overhead, which is executed for every emulated instruction in the system, will also be reduced whereby emulation performance is further improved. Experimental results have shown that the improvement obtained via the methods taught herein is greater than or equal to 10%.

The invention can be further understood with reference to FIGS. 1–8. FIG. 1 illustrates a block diagram of an emulator system 10 which is used to perform emulation or perform interpreted language execution in accordance with the present invention. The emulation system 10 is comprised of many portions/routines, each containing one or more software instructions. FIG. 1 illustrates that one such portion/ routine is the set-up code 11, wherein set-up code 11 contains computer instructions which initializes registers to enable proper software emulation. The emulation system 10 also contains a fetch-and-decode loop 12 which iteratively fetches instruction emulation opcodes and operand data from memory 124 (see FIG. 8) and performs proper decode operations on the instruction in order to determine which vector emulation routine should be executed. The "decode" processing performed by the routine 12 usually involves the generation of a table vector address which routes emulation software execution flow to one or more emulation routines within a table 14.

FIG. 1 illustrates a plurality of vector emulation routines within a look-up table 14. The vector emulation routines 14 in FIG. 1 specifically illustrate five emulation routines 16–24. However this is by example only, and any number of emulation routines may be used. Each routine 16–24 in FIG. 1 contains sixteen 32-bit words of information. Therefore, a first emulation routine would begin at an address referred to as TABLEBASE in FIG. 1 and end at an address TABLEBASE+63 when using byte-level addressing. A second emulation routine would begin at an address labeled in FIG. 1 as TABLEBASE+64 and end 64 bytes (i.e., 16 words) further on into the memory array. If 64 bytes is not enough room to emulate a particular instruction, a branch or jump instruction must be used at the end of the block in table 14 to branch/jump to another location outside of the table 14 to complete emulation of that particular instruction. Since each emulation routine (typically one routine exists for each emulated instruction) is assigned 64 bytes (i.e., 16 words) of space in which to store an emulation routine, each emulation routine begins at an address value that is multiple of 64 from the address TABLEBASE. Note that other sizes of table entries than 64 bytes may be used.

FIG. 1 illustrates a no operation (NOP) routine which begins at the address TABLEADDRESS and ends at the address TABLEADDRESS+63. Not all of the table space provided for a routine need be used by the respective routine whereby some wasted space can easily be tolerated. FIG. 1 also illustrates a byte integer push routine (BIPUSH) for a BIPUSH instruction. The BIPUSH routine is located at an address TABLEBASE+64×N. This BIPUSH routine 20 contains computer instructions which performs a byte integer push during emulation. An emulation POP routine 22 in FIG. 1 begins at an address TABLEBASE+64×M and contains computer instructions which are used to POP a top word off of an operand stack in memory. A last emulation routine 24 in FIG. 1 is illustrated as beginning at an address TABLEBASE+64×255. In other words, FIG. 1 specifically illustrates that there are $2^8$=256 routines within the table 14 in FIG. 1. In this 256-routine embodiment, a single opcode byte, as used in Java, can uniquely address any one of the 256 routines in FIG. 1. Note that any number of routines can be used whereby emulation of any one of Java, Pentium code, BASIC, Smalltalk, etc. can be performed using the method taught herein.

FIG. 2 illustrates specific software code which is used to implement the various functions illustrated previously in FIG. 1. For example, FIG. 2 illustrates specific instruction(s) which are used to implement the set-up code 11 from FIG. 1. FIG. 2 illustrates that a load address (LA) instruction is executed as part of the set-up code 11 in order to copy the assembler-determined TABLEBASE address into a TABLEBASE register where this central processing unit (CPU) hardware register is referred to as RTABLEBASE. In addition to this load address (LA) instruction, other instructions may be executed as part of the set-up code 11 in FIG. 2 to prepare a hardware system for emulation or interpreted language execution.

After execution of the set-up code 11, the fetch and decode loop 12 of FIG. 2 is executed. The fetch/decode loop 12 in FIG. 2 contains two assembler labels entitled "Fetch" and "Fetch2", which symbolically illustrate addresses when executing the computer code 12. The fetch and decode operation of the fetch and decode unit 12 begins by executing a load byte zero with update (LBZU) instruction. The execution of this instruction loads an opcode from an address stored within a program counter register (RPC) into a CPU hardware register referred to as ROPCODE. Specifically, the first LBZU instruction in the loop 12 of FIG. 2 adds the integer one to the program counter register (RPC), and then uses this incremented address to access an opcode from memory and store that opcode in the ROPCODE register. The ROPCODE register value is a thirty-two bit long value which can contain one of 256 unique values for Java. This 8-bit unique opcode value is used as an index value to access a specific emulation routine within the table 14 of FIG. 2. Since the routines within the table 14 are blocks of memory of sixteen words (or sixty-four bytes) in length, the opcode value read via the first LBZU instruction in FIG. 2 must be shifted to the left by 6-bit positions. In order to perform this index shifting function, a shift word left immediate (SWLI) instruction is used to shift the value stored in the ROPCODE register left by 6-bit positions whereby the shifted result is stored back into ROPCODE.

An ADD instruction is then used to add the shifted index stored within the ROPCODE register with the TABLEBASE address stored within the RTABLEBASE register. This addition of the RTABLEBASE register value and the ROPCODE register value is performed into destination that is a temporary register labeled as RTEMP. The RTEMP value now contains the address of the specific emulator instruction in table 14 which must be executed by the emulator in order to perform proper emulation of the desired computer instruction.

In order to properly branch to the specific emulation routine within table 14, a move to count register (MTCTR) instruction is executed to move the address stored in the RTEMP register to the count register (RCTR) within the CPU hardware architecture. The count register is a register internal to the architecture of the central processing unit (CPU) or processor where this count register is coupled to a branch processing unit (BPU) of the CPU. A subsequent branch count register (BCTR) instruction following the MTCTR instruction in routine 12 will then cause the emulated program to branch to the address stored within the count register to enable a change of execution flow to a routine within table 14. As illustrated in FIG. 2, the last instruction in the fetch decode loop 12 is this BCTR instruction which will then allow subsequent execution of one of the routines within table 14.

In between the execution of the MTCTR instruction and the BCTR instruction in routine 12 of FIG. 2, a pre-fetch operation is performed. The pre-fetch operation is performed by executing an additional LBZU instruction near the end of the fetch decode loop 12 in FIG. 2. This second LBZU instruction within the routine 12 increments the program counter register (RPC) by one and then accesses a data value from memory located at this incremented program counter value. At this time, the program is uncertain as to whether the data accessed via this second LBZU instruction is an emulation data operand or a new emulation instruction opcode. The determination of what is contained from this pre-fetch instruction is made by the code executed within table 14 subsequent to the execution of the BCTR instruction in routine 12 of FIG. 2.

FIG. 2 specifically illustrates three emulation routines 16, 20, and 22 originally illustrated in FIG. 1. The routine 16 is the first routine within the table 14 and is accessed by an 8-bit Opcode value of zero (e.g., 00000000 binary). When the Opcode having a value of all zeros is read by the routine 12, this zero value is shifted and added as an index to the TABLEBASE value whereby the RTEMP register will contain TABLEBASE+0. If the opcode read is equal to zero, the execution of the BCTR instruction in routine 12 will result in the execution of the software instructions in routine 16 within table 14 after execution of the BCTR instruction. Routine 16 implements a no-operation (NOP) routine whereby no functional operation is performed by the system, and the system is simply attempting to stall time. Since no operation is performed by the routine 16, routine 16 simply contains a branch back into a fetch decode loop 12 of FIG. 2. Since routine 16 is a NOP instruction emulation routine and since the NOP instruction has no operands, the routine 16 understands that the pre-fetch value from the second LBZU instruction in routine 12 is an opcode and not dataloperand(s). This means that the prefetched value from the memory which was accessed via the second LBZU instruction in routine 12 is an opcode. Since this pre-fetch value is an opcode, the routine 16 will branch to the label FETCH2 in routine 12 in order to process the pre-fetched value as an opcode. By performing a FETCH2 or FETCH branch at the end of all routines in table 14, continued looping and execution of fetch and decode operations is performed by the emulator until software termination is encountered.

If the opcode read via routine 12 in FIG. 2 is the binary value N (e.g., N=01101100 binary), the RTEMP value and the count register after execution of the routine 12 will contain the value TABLEBASE+N×64. Therefore, the BCTR instruction at the end of routine 12 will cause a change of execution flow so that instructions within the routine 20 of table 14 are executed. In routine 20, the first instruction is an extend sign byte instruction (EXTSB) which is performed on the contents of ROPCODE. This operation is performed on the opcode register since it is understood by the routine 20 that the pre-fetch value retrieved by the second LBZU instruction in routine 12 must represent a data value because the BIPUSH instruction is an emulated instruction that contains one instruction operand that is needed for proper emulation. The extend sign byte instruction must be executed since the BIPUSH operation performed by routine 20 requires a signed data value where the instruction LBZU only read an unsigned 8-bit value into a 32-bit space.

After extending the sign of the value in the ROPCODE register, a store word with update (STWU) instruction is executed. This instruction pushes the value in ROPCODE onto the Java operand stack by first decrementing the Java stack pointer (RSP) by 4 and then placing the 32-bit (4 byte) value of ROPCODE into this RSP location. After the stack is properly processed by the code in routine 20, a branch is performed back to the assembler label FETCH within routine 12. The branch of routine 20 does not return to the label FETCH2 since the routine 20 has used/consumed the pre-fetch byte from routine 12 and must now begin the routine 12 with a new instruction fetch.

If the Opcode read by the routine 12 is equal to M (e.g., M=11100110 binary), then the RTEMP value and the count register at the end of routine 12 will be equal to TABLEBASE+M×64. In this case, the BCTR instruction at the end of routine 12 will result in an execution flow continuing with routine 22 in table 14. Routine 22 performs a POP operation on an operand stack. In order to perform this POP operation, a load address (LA) instruction is performed using the operand stack pointer (RSP). This load address instruction adds a value of 4 to the operand stack pointer and places this address value back into the stack pointer (RSP) effectively removing one word from the operand stack. After this address processing is performed in routine 22, the POP operation is complete and execution returns to label FETCH2 in routine 12 since the pre-fetched value from the second LBZU instruction in routine 12 contains an opcode which must now be processed as an opcode in routine 12 without need for another new instruction fetch via the first LBZU instruction in routine 12.

Therefore, FIG. 2 illustrates specific ertulator routine 12 which executes, in a looping manner, to retrieve one or more of opcodes and data from external memory. The opcodes read via the routine 12 are processed to derive an appropriate software emulation vector which is used by the branch instruction BCTR to invoke emulation routines for that particular opcode. By performing the instruction BCTR, respective routines within table 14 are appropriately executed whereby all of the routines eventually return execution control to the fetched decode routine 12. Iterative emulation/interpretation continues in this looping manner until the program is terminated.

FIG. 2 can be used to illustrate the effects of emulation overhead on both emulation and interpreted language execution. As an example of the overhead, routine 22 in FIG. 2 performs a POP operation. In order to perform this POP operation using an emulation environment, the six instructions from routine 12 and the two instructions from routine 22 need to be executed in order to perform the emulated POP operation. However, out of these eight total instructions within the combined routines 12 and 22, only one of these eight instructions (the "LA RSP, 4(RSP)" instruction) performs the actual POP operation, while the rest of the seven of the eight instructions are executed as part of emulation overhead. The resulting POP emulation overhead is over 80% for the process of FIG. 2. Furthermore, since the routine 12 in FIG. 2 is executed for every instruction which needs emulation, any overhead within routine 12 greatly impacts the overall performance of emulation since routine 12 is continuously re-executed in a looping manner, Accordingly, any reduction in the instruction count for the routine 12 can greatly impact the overall performance of the emulation by greatly reducing the loop-executed overhead needed for every emulated instruction. In addition, if the fetch and decode loop 12 can be adjusted so that the code located within the routines 16–22 of table 14 can also optimized to fewer instructions, even greater performance improvement can be obtained during emulation.

This overhead and performance reduction is obtained via FIGS. 3–7 using the architecture of FIG. 1. FIG. 3 illustrates a new fetch and decode loop 12' which may be used in place of the prior art fetch and decode loop 12 illustrated in FIG. 2. The new fetch and decode loop 12' in FIG. 3 requires that the TABLEBASE address value be positioned on a 16K byte multiple address (e.g., 32K, 128K, 2048K, etc.) within the memory map. Once this L*16K TABLEBASE value has been set, where L is a finite positive integer, the code of FIG. 3 can be used to reduce the overhead of the fetch and decode loop 12 from FIG. 2.

The code in FIG. 3 begins by performing the same LBZU instruction previously discussed with respect to FIG. 2. However, FIG. 3 replaces the SWLI and ADD instruction of FIG. 2 with a single instruction INSRWI which stands for "insert from the right side of the register with a word immediate value." The operation performed by the INSRWI instruction is further illustrated graphically in the block diagram of FIG. 4.

FIG. 4 illustrates that the TABLEBASE value is positioned on a 16K memory boundary. Since the TABLEBASE value is so positioned, the most significant bits (MSBs) from position 0 to bit position 17 contain the TABLEBASE value high order bits while the low order bit positions 18 through 31 of the TABLEBASE value have an inherent binary value 0. The INSRWI instruction takes the opcode value which is stored in the ROPCODE register and shifts this value by 6. This shift of 6 bit positions to the left aligns the opcode value into the bit positions 18 through 25 of the RTABLEBASE register as illustrated in FIG. 4. This shifted opcode value can then be inserted, without the need for an ADD instruction, directly into the bit positions 18 through 25 of FIG. 4 which were previously 0 due to the 16K byte alignment of the TABLEBASE value. The INSRWI instruction has instruction operands that specify the values 8 and 6, which indicates that 8 bits are to be inserted into RTABLEBASE after performing the shift operation by 6-bit positions. Since these eight opcode bits are inserted into the RTABLEBASE register in a portion which was filled with binary 0 logic values in the RTABLEBASE base address, no add operation needs to be performed, whereby an instruction is saved in the routine 12' over the routine 12. In addition, the lower order bit positions 26 through 31 remain as zero as illustrated in FIG. 4. These low order 0 bit values are needed since the table 14 contains routines which are of 16 words in length. Therefore, by properly positioning and adjusting the TABLEBASE value, a single instruction INSRWI may be used in FIG. 3 to replace the previous two instructions SWLI and ADD from FIG. 2. It has been experimentally shown that this simplification of routine 12' alone has resulted in roughly a 10% improvement in the performance of a Java based emulator over that shown in FIG. 2.

After performing the INSRWI instruction in FIG. 3, the value stored in RTABLEBASE is moved to the count register (RCTR) and the pre-fetch operation LBZU is performed. These instructions, MTCTR and LBZU, are similar to that previously discussed for FIG. 2. After execution of the pre-fetch LBZU operation, the branch count register (BCTR) instruction is used to continue execution flow of the emulator in one of the routines 16–24 located in table 14.

While the method of FIGS. 3 and 4 obtained an improvement over the prior art routine of FIG. 2, the routine of FIG. 5 may obtain additional performance benefit over that discussed in FIG. 3. FIG. 5 illustrates a new fetch and decode loop 12" which is further optimized over that illustrated in FIGS. 2 or 3. Furthermore, the routine 12" of FIG. 5 allows for improved optimization of the individual instruction emulation routines 16–24 located in table 14. Specifically, the BIPUSH routine 20 of FIG. 2 may be simplified to the BIPUSH routine 20" of FIG. 5 due to changes in the fetch decode loop 12" in FIG. 5.

The fetch and decode loop 12" of FIG. 5 begins by executing the LBZU instruction and the INSRWI instruction as previously discussed with respect to FIG. 3. Therefore, the process of FIG. 5 has all of the advantages previously discussed for the emulation method of FIG. 3. After the execution of these two instructions in FIG. 5, the RTABLEBASE register contains the vector address of the emulation routine to be executed with the table 14. This vector address in RTABLEBASE is preserved by moving the value in RTABLEBASE to the count register (RCTR) via the MTCTR instruction. After execution of the MTCTR instruction, a new instruction, referred to as the "load and generate multiple data types" (LGMDT) is performed. The LGMDT is, generally, any executable computer instruction which loads an input value from memory or a like source and generates a plurality of result values from the input value wherein each result value has a different data format. The LGMDT instruction generally stores each result value having a different data format to different registers in a plurality of CPU registers so that the emulator may use any one of the data formats subsequent to the execution of the LGMDT instruction.

Specifically, the LGMDT instruction illustrated in FIG. 5 increments the Java program counter (RPC) by 1 and then reads a byte value (i.e., 8 bits) from the address indicated by the Java program counter (RPC). The LGMDT instruction in FIG. 5 treats the byte value read from memory as a data operand, even though the byte value may actually be an opcode read from memory. By treating the byte value as a data operand, the LGMDT instruction converts the read data byte to a 32-bit signed and unsigned data value wherein the unsigned data value is stored in a first ROPCODE register (e.g., ROPCODE register) and the signed data value is stored in the second ROPCODE register (e.g., ROPCODE+1 register). After execution of the LGMDT instruction, the BCTR instruction is used to change execution flow to execute one of the routines within table 14 as discussed hereinabove.

FIG. 5 specifically illustrates the advantage of the LGMDT instruction through the use of the BIPUSH instruction. The BIPUSH routine 20" has been simplified in FIG. 5 due to the presence of the LGMDT instruction in routine 12". Due to the execution of the LGMDT instruction, the extend sign byte instruction previously existing in the routine 20 as illustrated in FIG. 2 can be removed from the routine 20" in FIG. 5. This removal is allowed since the LGMDT instruction provides both signed and unsigned results for the routines in table 14 to use. In addition, the STWU instruction in routine 20" no longer accesses the ROPCODE location as illustrated in FIG. 2, but will access the ROPCODE+1 register which contains the signed value generated by the LGMDT instruction in routine 12". The register ROPCODE contains the unsigned value which is not needed by the routine 20". Therefore, by comparison, nine instructions are needed in FIG. 2 in order to emulate a BIPUSH instruction, whereas only seven instructions are needed to emulate a BIPUSH instruction using the solution of FIG. 5.

FIG. 6 illustrates a further performance improvement and overhead reduction than that illustrated in FIG. 5. FIG. 6 illustrates an expanded and more complicated LGMDT instruction than that illustrated in FIG. 5. However, this improved LGMDT instruction may be used to further simplify the emulation algorithms performed using the emulation system 10. The LGMDT instruction in FIG. 6 contains four instruction operands. The first operand is the ROPCODE register destination, the second operand is the address of the next opcode to fetch from memory using the Java program counter (RPC), the third operand is the number of bits in the opcode read from external memory (e.g., 8 in this example), and the fourth operand for the LGMDT instruction is the number of bit positions which the opcode should be shifted left before vector generation (e.g., 6 in this example). It is important to note that the operands for the LGMDT instruction can be reduced by hard-wiring or fixing certain operands to specific values or locations in hardware or in LGMDT instruction decode processing. For example, the bit size of 8 and the left shift value of 6 can be "hard-wired" in the LGMDT instruction whereby these parameters will not be programmable but will be fixed by the instruction's execution.

The LGMDT instruction will read the 8-bit value from external memory and generate three results in three different internal CPU registers. The first value generated by the LGMDT instruction in FIG. 6 is a vector address which is generated in accordance with FIG. 4 or a like process. A second value generated by the LGMDT instruction is an unsigned 32-bit operand/data value as previously discussed for FIG. 5. A third value generated by the LGMDT instruction in FIG. 6 is a 32-bit signed operand/data value generated from the opcode and placed in one of the internal ROPCODE registers. Generally, the vector addresses from the LGMDT instruction is placed in ROPCODE+2 register, the signed 32-bit operand/data value is placed in ROPCODE+1 register, and the unsigned 32-bit operand/data value is placed in the ROPCODE register. Given this placement of the three results from the LGMDT instruction, the MTCTR instruction moves the contents of the ROPCODE+2 register to the count register (RCTR). A second LGMDT instruction is executed to allow for pre-fetching of any one of a new opcode, a signed operand, or an unsigned operand. The BCTR instruction allows execution flow to continue in one of the routines located within table 14.

FIG. 6 specifically illustrates the BIPUSH operation 20'''. The routine 20''' is similar to that discussed with respect to FIG. 5.

FIG. 6 illustrates a POP operation 22'''. Since the LGMDT instruction has provided a vector calculation in addition to 32-bit signed and unsigned data values, the routine 22''' of FIG. 6 can return to the MTCTR instruction instead of returning to an INSRWVI instruction or an SWLI instruction as illustrated in FIG. 5 and FIG. 2 respectively. In other words, the routine of 22''' can simply return to a location within routine 12''' which updates the count register (RCTR) and does not need to perform pre-processing of any registers before performing such a move to the count register. Therefore, the code used in FIG. 6 saves one instruction in the execution of the POP operation 22''' and saves an additional one instruction over that illustrated in FIG. 5 when executing the BIPUSH operation 20'''. In essence, the code used in FIG. 6 needs six instructions in order to perform a BIPUSH operation whereas the prior art required nine operations to do the same BIPUSH process in FIG. 2. This is over a 30% savings in instruction usage in the BIPUSH routine. Similar savings will be seen for all other instructions in the emulation package or the interpreted language system. In summary, various new instructions have been introduced herein which allow for reduction of overhead in code emulation and interpreted language execution whereby computer performance can be greatly improved.

Figure 7:
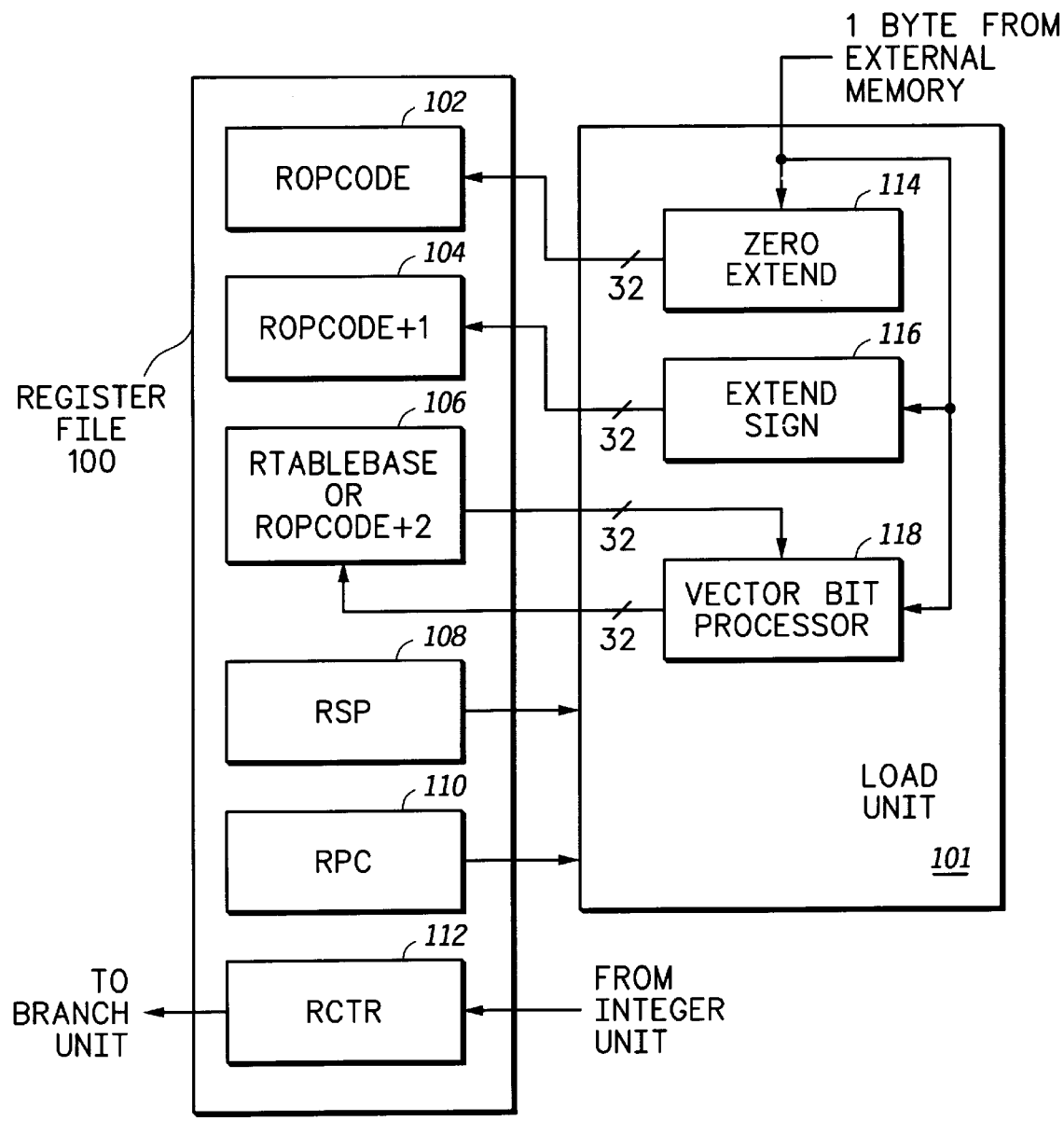
FIG. 7 illustrates, in a block diagram, specific hardware for implementing the software illustrated in FIG. 6 in accordance with the present invention.

FIG. 7 illustrates a register file 100 and a load unit 101 which may be used to implement the LGMDT instruction illustrated in FIG. 6. The register file 100 is shown containing six registers: ROPCODE 102, ROPCODE+1 104, ROPCODE+2 or RTABLEBASE 106, RSP 108, RPC 110, and RCTR 112. The central processing unit (CPU) hardware RSP 108 register is the operand "stack pointer", the RPC 110 register is the emulation "program counter", and the RCTR 112 register is the CPU "count register" for performing branch operations using the branch unit. The RSP 108 and RPC 110 registers allow the load unit 101 to read information from cache and/or external memory.

The load unit 101 reads a byte from memory in response to a LGMDT instruction. This byte is provided in parallel to three load sub-units 114, 116, and 118. The zero extend unit extends the byte value to a 32-bit unsigned value as though the byte value were a unsigned operand. This unsigned operand is then provided to an ROPCODE register 102. The byte value is sign extended using a sign extend unit 116. The sign extend unit 116 converts the byte value to a 32-bit signed value for use as a signed operand by accessing an ROPCODE+1 register 104 (this is the register numerically one greater than the ROPCODE register 102). The vector bit processor 118 of FIG. 7 performs either the shift-and-add operation of the SWLI and ADD instructions or performs the operation discussed in FIG. 4 to convert the RTABLEBASE/ROPCODE+2 and the byte value to a look-up vector used to access at least one routine within table 14. The code in table 14 and routine 12 may access any one of the three registers to obtain the value that is needed and may ignore all other unneeded values in the registers 102–106.

Figure 8:
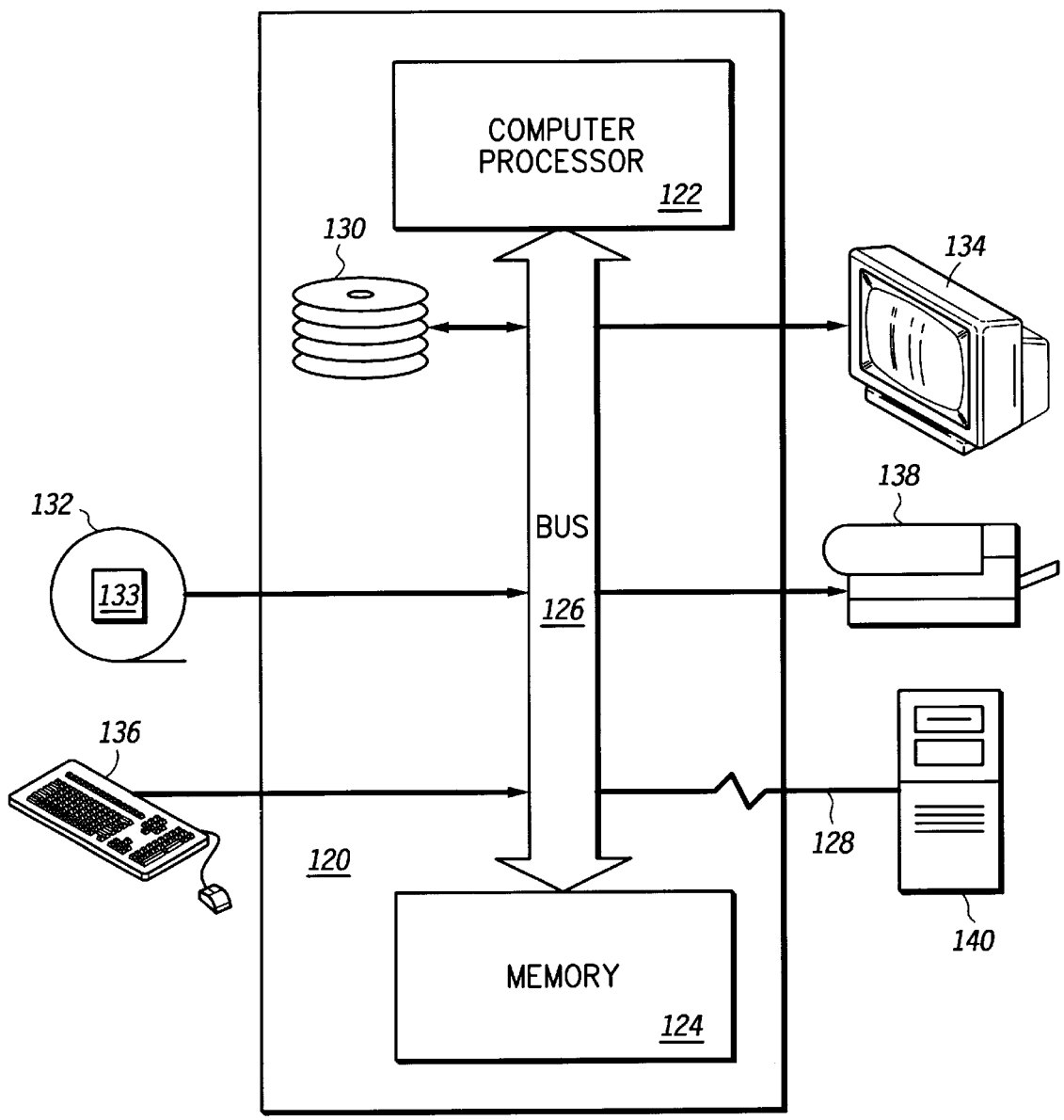
FIG. 8 is a block diagram illustrating a General Purpose Computer containing the specific hardware shown in FIG. 7.

FIG. 8 is a block diagram illustrating a General Purpose Computer 120 containing the load/store unit 101 and register file 100 shown in FIG. 7. The General Purpose Computer 120 has a Central Processing Unit (CPU) or processor 122 containing the load/store unit 101 and register file 100. Memory 124 is connected to the processor 122 by a Bus 126. Memory 124 is a relatively high speed machine readable medium and includes Volatile Memories such as DRAM, and SRAM, and Non-Volatile Memories such as, ROM, FLASH, EPROM, EEPROM, and bubble memory. Also connected to the Bus 126 are Secondary Storage 130, External Storage 132, output devices such as a monitor 134, input devices such as a keyboard (with mouse) 136, and printers 138. Secondary Storage 130 includes machine readable media such as hard disk drives, magnetic drum, and bubble memory. External Storage 132 includes machine readable media such as floppy disks, removable hard drives, magnetic tape, CD-ROM, and even other computers, possibly connected via a communications line. The distinction drawn here between Secondary Storage 130 and External Storage 132 is primarily for convenience in describing the invention. As such, it should be appreciated that there is substantial functional overlap between these elements. Computer software such as emulation code 10–24 and user programs can be stored in a Computer Software Storage Medium, such as memory 124, Secondary Storage 130, and External Storage 132. Executable versions of computer software 133 can be read from a Non-Volatile Storage Medium such as External Storage 132, Secondary Storage 130, and Non-Volatile Memory and loaded for execution directly into Volatile Memory, executed directly out of Non-Volatile Memory, or stored on the Secondary Storage 130 prior to loading into Volatile Memory for execution.

Although the invention has been described and illustrated with reference to specific embodiments, it is not intended that the invention be limited to those illustrative embodiments. Those skilled in the art will recognize that modifications and variations may be made without departing from the spirit and scope of the invention. For example, the LGMDT instruction taught herein may not only process for output 8-bit values but may process any sized (16-bit, 4-bit, 32-bit, 64-bit, etc.) values into different data formats for storage in separate registers. The process used herein may be used to generate any signed number, unsigned number, floating point format, different integer format, left or right justified number, shifted or rotated value, big endian value, little endian value, ASCII output, or any other numerical format in parallel to any other numerical format for improving emulation performance or interpreted language execution. In some cases, the code from routine 12 may be placed into the routines in table 14 to save branch prediction and branch cache load. Therefore, it is intended that this invention encompass all of the variations and modifications as fall within the scope of the appended claim.

What is claimed is:

1. A processor capable of executing a multifunction instruction comprising:

a plurality of registers; and a multifunction instruction execution circuit, wherein:

the multifunction instruction execution circuit moves a plurality of operands in a corresponding plurality of formats into a corresponding plurality of registers from a common location in response to a single execution of the multifunction instruction;

wherein:

a first one of the corresponding plurality of formats
is an integer encoded in memory in an unsigned
byte format,
a second one of the corresponding plurality of formats is an integer encoded in memory in a signed byte format, and
a third one of the corresponding plurality of formats is generated by the processor by inserting a fixed number of bits from the common location into a fixed location in a third one of the corresponding plurality of registers.

2. The processor in claim 1 wherein:
a first one of the corresponding plurality of formats is an integer encoded in memory in an unsigned byte format.

3. The processor in claim 1 wherein:
a first one of the corresponding plurality of formats is an integer encoded in memory in a signed byte format.

4. The processor in claim 1 wherein:
a first one of the corresponding plurality of formats is an integer encoded in memory in an unsigned short format.

5. The processor in claim 1 wherein:
a first one of the corresponding plurality of formats is an integer encoded in memory in a signed short format.

6. The processor in claim 1 wherein:
a first one of the corresponding plurality of formats is generated by the processor by inserting a fixed number of bits from the common location into a fixed location in a first one of the corresponding plurality of registers.

7. The processor in claim 1 wherein:
the multifunction instruction explicitly specifies a first one of the corresponding plurality of registers and explicitly specifies a second one of the corresponding plurality of registers.

8. The processor in claim 1 wherein:
the multifunction instruction explicitly specifies a first one of the corresponding plurality of registers and implicitly specifies a second one of the corresponding plurality of registers.

9. A computer program stored on a software storage medium for execution on a processor capable of executing a multifunction instruction and having a plurality of registers,
said computer program comprising:
a first set of computer instructions stored on the software storage medium comprising the multifunction instruction, wherein:
a single execution of the multifunction instruction moves a plurality of operands in a corresponding plurality of formats into a corresponding plurality of registers from a common location;
a second set of computer instructions stored on the software storage medium comprising:
a first operand instruction which utilizes a first one of the corresponding plurality of registers in a first one of the corresponding plurality of formats as a first instruction register operand; and
a third set of computer instructions stored on the software storage medium comprising:
a second operand instruction which utilizes a second one of the corresponding plurality of registers in a second one of the corresponding plurality of formats as a second instruction register operand, wherein:
a first one of the corresponding plurality of formats is an integer encoded in memory in an unsigned byte format,
a second one of the corresponding plurality of formats is an integer encoded in memory in a signed byte format, and
a fourth set of computer instructions stored on the software storage medium comprising:
a third operand instruction which utilizes a third one of the corresponding plurality of registers in a third one of the corresponding plurality of formats as a third instruction register operand.

10. The computer program in claim 9 wherein:
a first one of the corresponding plurality of formats is an integer encoded in memory in an unsigned byte format.

11. The computer program in claim 9 wherein:
a first one of the corresponding plurality of formats is an integer encoded in memory in a signed byte format.

12. The computer program in claim 9 wherein:
a first one of the corresponding plurality of formats is an integer encoded in memory in an unsigned short format.

13. The computer program in claim 9 wherein:
a first one of the corresponding plurality of formats is an integer encoded in memory in a signed short format.

14. The computer program in claim 9 wherein:
a first one of the corresponding plurality of formats is generated by the processor by inserting a fixed number of bits from the common location into a fixed location in a first one of the corresponding plurality of registers.

15. The computer program in claim 9 wherein:
the computer program is a Java bytecode interpreter.

16. A method of forming in a first register a table entry address for an entry in a table stored in a memory comprising:
loading the first register with a table base address for the table stored in the memory, the table base address positioned on one of a plurality of 16 kilobyte address boundaries in accordance with a memory map of the memory; and
inserting a table index into the first register, wherein:
the table index contains a first fixed number of ordered bits,
the first fixed number of ordered bits in the table index are inserted into the first register left shifted by a second fixed number of bits,
a low order fixed number of bits in the table base address are zero, and
the low order fixed number of bits is greater than or equal to a sum of the first fixed number and the second fixed number.

17. The method in claim 16 wherein:
the table index is inserted from a location in the memory.

18. The method in claim 16 wherein:
the table index is inserted from a second register.

19. The method in claim 16 which further comprises:
branching to a jump address specified by the first register after the table index is inserted.

20. The method in claim 19 which further comprises:
loading a second register from the first register, wherein:
the branching branches to the jump address in the second register.

21. The method in claim 19 which further comprises:
interpreting an instruction after branching to the jump address, wherein:
the table index is an instruction op code.

22. The method in claim 19 wherein:
the table base address is a base address of a software routine table containing a plurality of software routines indexed by the table index.

23. The method in claim 19 wherein:

the plurality of software routines in the software routine table interpret Java bytecodes, and the table index is a Java bytecode.

24. A processor capable of executing a multifunction instruction comprising:

a plurality of registers; and a multifunction instruction execution circuit, wherein:

the multifunction instruction execution circuit moves a plurality of operands in a corresponding plurality of formats into a corresponding plurality of registers from a common location in response to a single execution of the multifunction instruction; and wherein:

a first one of the corresponding plurality of formats is generated by the processor by inserting a fixed number of bits from the common location into a fixed location in a first one of the corresponding plurality of registers.

25. A processor capable of executing a multifunction instruction comprising:

a plurality of registers; and a multifunction instruction execution circuit, wherein:

the multifunction instruction execution circuit moves a plurality of operands in a corresponding plurality of formats into a corresponding plurality of registers from a common location in response, and the multifunction instruction explicitly specifies a first one of the corresponding plurality of registers and explicitly specifies a second one of the corresponding plurality of registers.

26. A processor capable of executing a multifunction instruction comprising:

a plurality of registers; and a multifunction instruction execution circuit, wherein:

the multifunction instruction execution circuit moves a plurality of operands in a corresponding plurality of formats into a corresponding plurality of registers from a common location in response, and the multifunction instruction explicitly specifies a first one of the corresponding plurality of registers and implicitly specifies a second one of the corresponding plurality of registers.

27. A computer program stored on a software storage medium for execution on a processor capable of executing a multifunction instruction and having a plurality of registers, said computer program comprising:

a first set of computer instructions stored on the software storage medium comprising the multifunction instruction, wherein:

a single execution of the multifunction instruction moves a plurality of operands in a corresponding plurality of formats into a corresponding plurality of registers from a common location;

a second set of computer instructions stored on the software storage medium comprising:

a first operand instruction which utilizes a first one of the corresponding plurality of registers in a first one of the corresponding plurality of formats as a first instruction register operand; and a third set of computer instructions stored on the software storage medium comprising:

a second operand instruction which utilizes a second one of the corresponding plurality of registers in a second one of the corresponding plurality of formats as a second instruction register operand, wherein a first one of the corresponding plurality of formats is generated by the processor by inserting a fixed number of bits from the common location into a fixed location in a first one of the corresponding plurality of registers.

* * * * *